[19] United States Patent
Aida

[11] Patent Number: 4,997,290
[45] Date of Patent: Mar. 5, 1991

[54] ROLLING BEARING ARRANGEMENT
[75] Inventor: Masahiro Aida, Yokohama, Japan
[73] Assignee: Nissan Motor Company, Ltd., Japan
[21] Appl. No.: 360,795
[22] Filed: Jun. 2, 1989
[30] Foreign Application Priority Data
  Jun. 7, 1988 [JP] Japan .................................. 63-138504
[51] Int. Cl.$^5$ ........................ F16C 19/00; F16C 33/66
[52] U.S. Cl. ...................................... 384/99; 384/474;
  384/518
[58] Field of Search ................. 384/99, 474, 495, 518,
  384/537, 558, 563, 901, 906

[56]   References Cited
     U.S. PATENT DOCUMENTS
  4,676,667  6/1987  Komatsu et al. ..................... 384/517
  4,721,398  1/1988  Miyashita et al. .................... 384/99
  4,721,441  1/1988  Miyoshita et al. ............... 384/518 X OTHER PUBLICATIONS
Japanese Utility Model Provisional Publication No. 61-134536.

Primary Examiner—Daniel P. Stodola
Assistant Examiner—William G. Battista, Jr.
Attorney, Agent, or Firm—Lowe, Price, LeBlanc, Becker & Shur

[57]           ABSTRACT
A rolling bearing arrangement for a turbocharger is comprised of a bearing housing relative to which a rolling bearing is supported. The rolling bearing is securely provided with an outer sleeve which is disposed to surround the periphery of the rolling bearing. The rolling bearing is supported through the outer sleeve on the bearing housing. A first annular space is defined between the outer sleeve and the inner periphery of the bearing housing. An oil inlet opening is opened at the inner periphery of the bearing housing so that lubricating oil is supplied through the oil inlet opening to the first annular space. An oil film damper clearance is formed between the outer sleeve and the bearing housing inner periphery and located adjacent the first annular space in the axial direction of the outer sleeve so that the entire flow of lubricating oil supplied to the first annular space passes through the oil film damper clearance. A second annular space is defined between the outer sleeve and the bearing housing inner periphery so that at least a part of the lubricating oil passed through the oil film damper clearance is supplied to the second annular space. An oil supply passage is so formed that lubricating oil from the second annular space is introduced to the rolling bearing. Additionally, an oil bypass passage is so formed that lubricating oil from the second annular space is introduced to an oil outlet opening through which the lubricating oil is discharged out of the bearing housing.

9 Claims, 3 Drawing Sheets

ROLLING BEARING ARRANGEMENT

BACKGROUND OF THE INVENTION

1. Field of the Invention

This invention relates to a rolling bearing arrangement provided with a vibration damping device and a lubricating oil supply device and, more particularly, to improvements in such a rolling bearing arrangement in which vibration damping is accomplished by an oil film damper while supplying an appropriate amount of lubricating oil to the rolling bearing.

2. Description of the Prior Art

As a rolling bearing arrangement provided with an oil film damper for accomplishing vibration damping of a rolling bearing, there has been proposed one disclosed in Japanese Utility Model Publication No 61-134536 which relates to a ball bearing arrangement for a supercharger. In this conventional arrangement, so-called oil film dampers are respectively formed along the outer peripheries of a turbine side ball bearing and a compressor side ball bearing, thereby supporting the ball bearings in a bearing housing in a floating state. The oil film dampers and the ball bearings are adapted to be supplied with lubricating oil through an oil inlet opening formed in the bearing housing. More specifically, the oil inlet opening opens to an annular space which is formed between the bearing housing and an annular groove formed in an outer sleeve surrounding the ball bearing. Accordingly, lubricating oil supplied from the oil inlet opening into the bearing housing is introduced to the annular space.

A part of the thus introduced lubricating oil is fed oil film dampers which are adjacent to the annular space and positioned on the opposite sides of the annular space in the axial direction, thereby constituting the oil film damper under the action of the thus fed lubricating oil. The oil film damper supports the ball bearings and therefore the rotatable turbine shaft of the supercharger in a floating state, thus suppressing vibration of the turbine shaft. The remaining part of the lubricating oil supplied to the annular space is fed to the ball bearing through a small diameter passage thereby achieving lubrication and cooling of the ball bearing. Thus, in the conventional rolling bearing arrangement, lubricating oil introduced from oil supply opening of the bearing housing to the annular space is distributed in parallel for the oil film damper and for lubrication of the ball bearing, and therefore it is difficult to simultaneously realize a sufficient vibration damping performance and optimizing of the lubricating oil supply amount to the ball bearing, a suitable control of distribution of the lubricating oil.

In other words, vibration damping performance is degraded if the lubricating oil supply amount to the ball bearing is adjusted after adjustment to obtain a required vibration damping performance, whereas it is difficult to supply an optimum amount of lubricating oil to the ball bearings if an adjustment for obtaining the required vibration damping performance is made after adjustment of the lubricating oil supply amount to the ball bearings to an optimum value. Thus, it is difficult to simultaneously meet both the requirements of oil flow for vibration damping performance and for providing a lubricating supply amount to the ball bearing.

SUMMARY OF THE INVENTION

It is an object of the present invention to provide an improved rolling bearing arrangement which can achieve both optional vibration damping performance for the rolling bearing and optimizing and stabilizing of a supply of lubricating oil to the rolling bearing.

Another object of the present invention is to provide an improved rolling bearing arrangement in which an adjustment for optimizing the amount of lubricating oil to be supplied to the rolling bearing can be accomplished without degrading the vibration damping performance, even after an adjustment for optimizing the vibration damping performance of the rolling bearing.

A rolling bearing arrangement of the present invention is comprised of a bearing housing relative to which a rolling bearing is supported. The rolling bearing is securely provided with an outer sleeve which is disposed to surround the periphery of the rolling bearing. The rolling bearing is supported through the outer sleeve to the bearing housing. A first annular space is defined between the outer sleeve and the inner periphery of the bearing housing. An oil inlet opening is opened at the inner periphery of the bearing housing so that lubricating oil is supplied through the oil inlet opening to the first annular space. An oil film damper clearance is formed between the outer sleeve and the bearing housing inner periphery and located adjacent the first annular space in the axial direction of the outer sleeve so that the entire flow of lubricating oil supplied to the first annular space passes through the oil film damper clearance. A second annular space is defined between the outer sleeve and the bearing housing inner periphery so that at least a part of the lubricating oil passed through the oil film damper clearance is supplied to the second annular space. An oil supply passage is so formed that lubricating oil from the second annular space is introduced to the rolling bearing. Additionally, an oil bypass passage is so formed that lubricating oil from the second annular space is introduced to an oil outlet opening through which the lubricating oil is discharged out of the bearing housing.

With this rolling bearing arrangement, the entire flow of lubricating oil supplied to the first annular space passes through the oil film damper clearance and thereafter at least a part of the lubricating oil is introduced to the second annular space. The lubricating oil supplied to the second annular space is fed through the oil supply passage to the rolling bearing and simultaneously introduced through the oil bypass passage to the oil outlet opening.

Thus, since there is formed the second annular space (to which lubricating oil passed through the oil film damper clearance is introduced) on the upstream side of the rolling bearing, oil pressure variation is smaller in the first annular space even if the cross-sectional area of the oil supply passage for the rolling bearings is changed, thereby preventing degradation of the vibration damping performance of the oil film damper from degrading. Accordingly, it becomes possible to optimize the amount of lubricating oil to be supplied to the rolling bearing by adjusting the cross-sectional area of the oil supply passage and/or the oil bypass passage without degrading the vibration damping performance, after optimizing the vibration damping performance by adjusting the thickness and length of the oil film damper clearance.

DETAILED DESCRIPTION OF THE INVENTION

Figure 1:
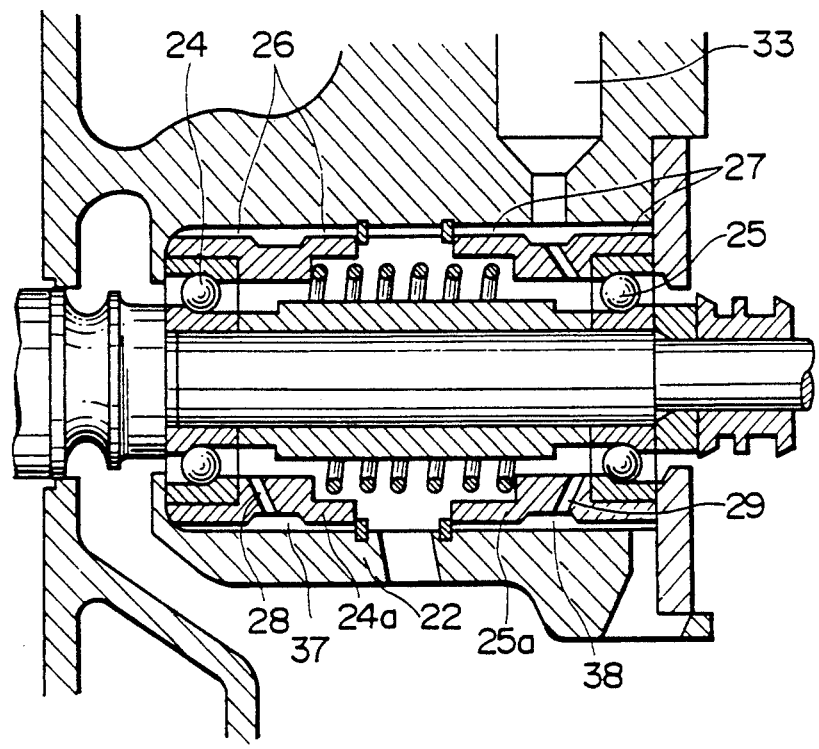
FIG. 1 is a fragmentary sectional view showing a conventional rolling bearing arrangement.

To facilitate understanding of the present invention, a brief reference will be made to a conventional rolling bearing arrangement, depicted in FIGS. 1 and 2. The conventional rolling bearing arrangement is, for example, disclosed in Japanese Patent Provisional Publication No. 61-134536. Referring to FIG. 1, the conventional rolling bearing arrangement is for a supercharger (turbocharger) and is provided with so-called oil film dampers 26, 27 which are respectively formed along the outer peripheries of a turbine side ball bearing 24 and a compressor side ball bearing 25, thereby supporting the ball bearings 24, 25 in a bearing housing 22 in a floating state.

Here, the oil film dampers 26, 27 and the ball bearings 24, 25 are adapted to be supplied with lubricating oil through an oil inlet opening 33 formed in the bearing housing 22. More specifically, the oil inlet opening 33 opens to an annular space 37, 38 which is formed between the bearing housing 22 and the annular groove formed in an outer sleeve 24a, 25a surrounding the ball bearing 24, 25. Accordingly, lubricating oil supplied from the oil inlet opening 33 into the bearing housing 22 is introduced to the annular space 37, 38. A part of the thus introduced lubricating oil is fed to the oil film dampers 26, 27 which are adjacent to the annular space 37, 38 and positioned on the opposite sides of the annular space 37, 38 in the axial direction, thereby constituting the oil film damper 26, 27 under the action of the thus fed lubricating oil. The oil film damper 26, 27 supports the ball bearings 24, 25 and therefore the rotatable turbine shaft of the supercharger in a floating state, thus suppressing vibration of the turbine shaft.

The remaining part of the lubricating oil supplied to the annular space 37, 38 is fed to the ball bearing 24, 25 through a small diameter passage 28, 29 thereby achieving lubrication and cooling of the ball bearing 24, 25. The configuration of such a lubricating oil supply path of this conventional arrangement is schematically shown as in FIG. 2.

Figure 2:
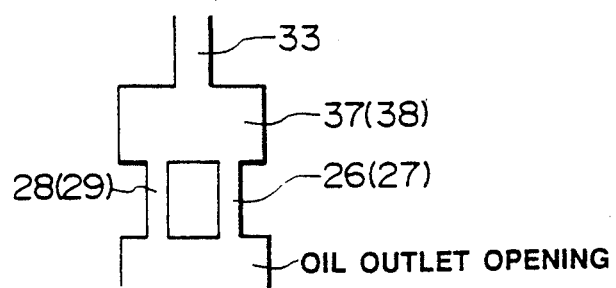
FIG. 2 is a schematic illustration of a lubricating oil supply path in the rolling bearing arrangement of FIG. 1.

With reference to FIG. 2, in order to optimize vibration damping performance by the oil film damper 26, 27, it is usual to adjust the thickness (the clearance between the outer sleeve 24a, 25a and the bearing housing 22) and the length in the axial direction of the oil film damper 26, 27. Additionally, there exists an optimum value of lubricating oil to be supplied to the ball bearing 24, 25. In other words, if the amount of lubricating oil supplied to the ball bearing is too small, lubrication and cooling of the ball bearing 24, 25 becomes insufficient thereby sharply degrading durability of the ball bearing 24, 25. In contrast, if the amount of lubricating oil supplied is too large, oil stirring resistance of the ball bearings 24, 25 becomes high thereby degrading rotation response of the rotatable turbine shaft of the supercharger. Thus, it is necessary to adjust the lubricating oil supplied amount to obtain the required durability and rotation response of the ball bearing 24, 25.

However, difficulties have been encountered in the above-discussed conventional rolling bearing arrangement, in which lubricating oil introduced from oil supply opening 33 of the bearing housing 22 to the annular space 37, 38 is distributed in parallel for the oil film dampers 26, 27 and for lubrication of the ball bearings 24, 25, and therefore it is difficult to simultaneously realize a sufficient vibration damping performance and optimizing of the lubricating oil supply amount to the ball bearings 24, 25 even under a suitable control a corresponding of distribution ratio of the lubricating oil flows.

In other words, if the thickness and the axial length of the oil film dampers 26, 27 is changed to optimize vibration damping performance after adjusting the cross-sectional area of the small diameter oil supply passages 28, 29 in the outer sleeves 24a, 24b to optimize lubricating oil supply amount to the ball bearings 24, 25, the flow resistance of lubricating oil in the oil film damper 26, 27 unavoidably changes and this alters the oil pressure in the annular space 37, 38, thereby changing the distribution ratio of the lubricating oil flow to be supplied to the oil film dampers 26, 27 and the lubricating oil to be supplied to the ball bearings 24, 25 so that the lubricating oil supply amount to the ball bearings 24, 25 unavoidably shifts from its optimum value.

Conversely if the cross-sectional area of the small diameter oil supply passages 28, 29 is changed to optimize the lubricating oil supply amount to the ball bearings 24, 25 after adjustment of the thickness and axial length of the oil film damper 26, 27 to obtain a required vibration damping performance, the oil pressure in the annular space 37, 38 is unavoidably changed to alter the pressure state of vibration damping film of the oil film dampers 26, 27, thereby degrading vibration damping performance.

Thus, in the conventional rolling bearing arrangement, vibration damping performance is degraded if the lubricating oil supply amount to the ball bearing 24, 25 is adjusted after adjustment of obtaining a required vibration damping performance, whereas it is difficult to supply an optimum amount of lubricating oil to the ball bearings 24, 25 if adjustment for obtaining the required vibration damping performance is made after adjustment of the lubricating oil supply amount to the ball bearings 24, 25 to an optimum value. Thus, it is difficult to simultaneously meet both the requirements of vibration damping performance and lubricating supply amount to the ball bearing.

In view of the above description of the conventional rolling bearing arrangement, reference is made to FIGS. 3 to 6, wherein a preferred embodiment of the rolling bearing arrangement of the present invention is illustrated. The rolling bearing arrangement forms part of a supercharger (turbocharger) for an automotive vehicle and includes a bearing housing 2 disposed in a center housing 1 of the supercharger. Two annular ball bearings 4, 5 are provided respectively with cylindrical outer sleeves 4a, 5a and supported on the inner peripheral surface of the bearing housing 2 in a floating state under the action of so-called oil film dampers 6, 7. A turbine shaft 3 is rotatably supported by the ball bearings 6, 7 and provided on the side of the bearing 4 with a turbine wheel (not shown) and on the side of the bearing 5 with a compressor wheel (not shown).

More specifically, the two ball bearings 4, 5 are coaxially mounted on the turbine shaft 3 and located spaced apart from each other. The outer sleeve 4a is generally cylindrical and coaxially secured to the outer periphery of the outer race (no numeral) of the ball bearing 4. Similarly, the outer sleeve 5a is generally cylindrical and coaxially secured to the outer periphery of the outer race (no numeral) of the ball bearing 5. The turbine shaft 3 is fitted in the inner races (no numerals). As shown, the outer race of each ball bearing 4, 5 is press-fitted to an annular cutout (no numeral) formed at the inner periphery in the axially outside end section of the outer sleeve 4a, 5a.

A compression coil spring 8 is disposed between the facing end faces of the outer sleeves 4a, 5a in such a manner as to bias the outer sleeves 4a, 5a in a direction to separate from each other. A pin 10 is fixedly secured to the bearing housing 2 in order to suitably position a thrust receiving member 9 in the direction of thrust of the outer sleeves 4a, 5a in a place between the outer sleeves 4a, 5a. It will be understood that the thrust receiving member 9 functions to receive the thrust of the outer sleeves 4a, 5a.

The bearing housing 2 is formed with an oil inlet opening 13 from which lubricating oil is supplied to the oil film dampers 6, 7 and to the ball bearings 4, 5 and finally discharged out of the center housing 1 through a central oil outlet opening 14, a turbine side oil outlet opening 15 and a compressor side oil outlet opening 16. As shown in FIGS. 2A and 2B, the outer sleeve 4a, 5a of each ball bearing 4, 5 is provided on the above-mentioned facing end faces with a plurality of projections 17 which are located at predetermined intervals in the circumferential direction of the outer sleeve. Additionally, a bearing spacer 11 is disposed between the inner races of the ball bearings 4, 5. The reference numeral 12 designates a radially outwardly extending flange-like oil splashing member by which lubricating oil is splashed.

The oil film dampers 6, 7 for damping vibration of the bearings 4, 5 will now be discussed in detail.

The outer sleeve 4a of the ball bearing 4 is coaxially formed on its outer periphery with first and second annular grooves $G_1$, $G_2$ which are separate from and parallel with each other. The first annular groove $G_1$ is located outside relative to the second annular groove $G_2$ in the axial direction of the outer sleeve 4a. The first annular groove $G_1$ is formed separate from the axially outside end face of the outer sleeve 4a. As a result, two annular land portions $L_1$, $L_2$ are formed on the opposite sides of the first annular groove $G_1$ and spaced a predetermined distance from each other in the axial direction of the outer sleeve 4a. The land portion $L_1$ is located between the first and second annual grooves $G_1$, $G_2$. It is to be noted that an oil film damper clearance 6a is formed between the flat peripheral surface of the land portion $L_1$ and the inner peripheral surface of the bearing housing 2, and another oil film damper clearance 6b is formed between the flat peripheral surface of the land portion $L_2$ and the inner peripheral surface of the bearing housing 2. Thus, the oil film damper 6 is constituted by the two separate oil film damper clearances 6a, 6b.

In connection with the above, a first annular space 18a is formed between the surface of the annular groove $G_1$ of the outer sleeve 4a and the inner peripheral surface of the bearing housing 2, and a second annular space 19a is formed between the surface of the annular groove $G_2$ and the inner peripheral surface of the bearing housing 2. The first annular space 18a is supplied with lubricating oil from the oil inlet opening 13. A further annular land portion $L_3$ is formed adjacent the annular groove $G_2$ and on the inside of the groove $G_2$ in the axial direction of the outer sleeve 4a. An annular bypass passage 20a is formed between the flat peripheral surface of the annular land portion $L_3$ and the inner surface of the bearing housing 2. Thus, in this embodiment, the oil film damper clearance 6b, the first annular space 18a, the oil film damper clearance 6a, the second annular space 19a and the bypass passage 20a are formed in the order mentioned in the axial direction from the outside to inside of the outer sleeve 4a. Furthermore, an oil supply passage 21a is formed in the outer sleeve 4a in such a manner to communicate the second annular space 19a and the inside of the outer sleeve 4a so that lubricating oil within the second annular space 19a is supplied to the ball bearing 4.

Similarly, the outer sleeve 5a of the ball bearing 5 is coaxially formed on its outer periphery with first and second annular grooves $G_1'$, $G_2'$ which are separate from and parallel with each other. The first annular groove $G_1'$ is located outside relative to the second annular groove $G_2'$ in the axial direction of the outer sleeve 5a. The first annular groove $G_1'$ is formed separate from the axially outer end face of the outer sleeve 5a. As a result, two annular land portions $L_1'$, $L_2'$ are formed on the opposite sides of the first annular groove $G_1'$ and spaced a predetermined distance from each other in the axial direction of the outer sleeve 5a. The land portion $L_1'$ is located between the first and second grooves $G_1'$, $G_2'$. It is to be noted that an oil film damper clearance 7a is formed between the flat peripheral surface of the land portion $L_1'$ and the inner peripheral surface of the bearing housing 2, and another oil film damper clearance 7b is formed between the flat peripheral surface of the land portion $L_2'$ and the inner peripheral surface of the bearing housing 2. Thus, the oil film damper 7 is constituted by the two separate oil film damper clearances 7a, 7b.

Figure 3:
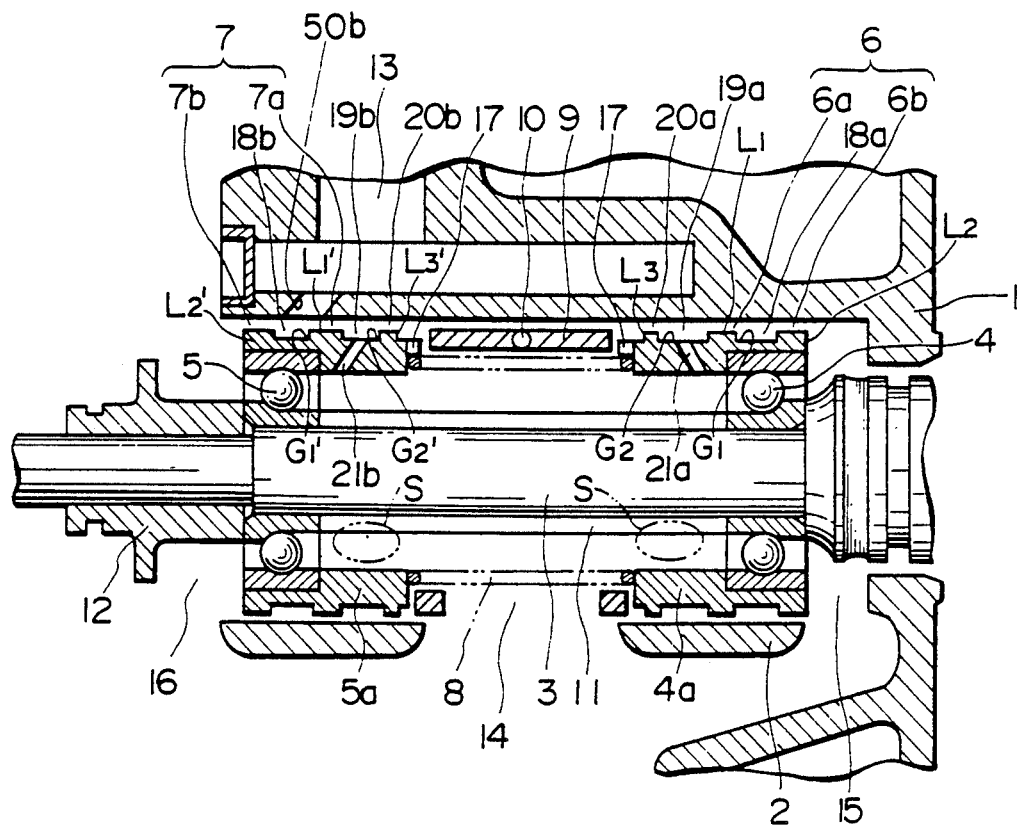
FIG. 3 is a fragmentary cross-sectional view showing a preferred embodiment of a rolling bearing arrangement in accordance with the present invention.

In connection with the above, in the preferred embodiment illustrated in FIG. 3, a first annular space 18b is formed between the surface of the annular groove $G_1'$ of the outer sleeve 5a and the inner peripheral surface of the bearing housing 2, and a second annular space 19b is formed between the surface of the annular groove $G_2'$ and the inner peripheral surface of the bearing housing 2. The first annular space 18b is supplied with lubricating oil from the oil inlet opening 13 through an oil flow passage 50b. Additionally, a further annular land portion $L_3'$ is formed adjacent the annular groove $G_2'$ and on the inside of the groove $G_2'$ in the axial direction of the outer sleeve 5a. An annular bypass passage 20b is formed between the flat peripheral surface of the annular land portion $L_3'$ and the inner peripheral surface of the bearing housing 2. Thus, in this embodiment, the oil film damper clearance 7b, the first annular space 18b, the oil film damper clearance 7a, the second annular space 19b and the bypass passage 20b are formed in the order mentioned in the axial direction from the outside to inside of the outer sleeve 5a. Furthermore, an oil supply passage 21a is formed in the outer sleeve 5a in such a manner to communicate the second annular space 19b and the inside of the outer sleeve 5a so that lubricating oil within the second annular space 19a is supplied to the ball bearing 5.

The manner of operation of this rolling bearing arrangement is discussed hereinafter.

Lubricating oil supplied through the oil inlet opening 13 is introduced into the first annular space 18a, 18b, through oil flow passages 50b (best seen in FIG. 3), and thereafter the entire flow of the lubricating oil introduced into each first annular space 18a, 18b is distributed to the oil film damper clearances 6a, 6b and 7a, 7b. Thus, the oil film damper clearances 6a, 6b and 7a, 7b are filled with lubricating oil thus serving as the oil film dampers 6, 7 respectively for the ball bearings 4, 5, so that the ball bearing outer sleeves 4a, 5a are supported in a floating state to the bearing housing 2. Lubricating oil passed through the outside oil film damper clearance 6b, 7b is discharged out of the center housing 1 through the turbine side oil outlet opening 15 or the compressor side oil outlet opening 16.

Figure 4A:
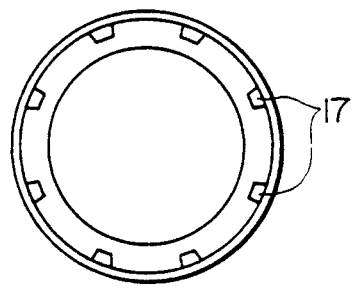
FIG. 4A is a front view of an outer sleeve used in the rolling bearing of FIG. 1.
Figure 4B:
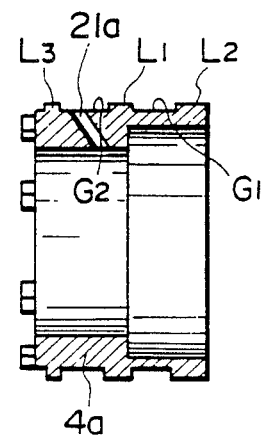
FIG. 4B is a an axial sectional view of the outer sleeve of FIG. 2A.

Lubricating oil passed through the inside oil film damper clearance 6a, 7a is introduced to the second annular space 19a, 19b. A part of the thus introduced lubricating oil is supplied through the oil supply passage 21a, 21b to the ball bearing 4, 5, thereby accomplishing lubrication and cooling of the ball bearings 4, 5. The remaining part of the introduced lubricating oil is passed through the bypass passage 20a, 20b and then discharged through the central oil outlet opening 14. During this lubricating oil discharging, a space is maintained between the thrust receiving member 9 and the outer sleeve 4a, 5a under the action of the projections formed at the end face of each annular sleeve 4a, 5a as shown in FIGS. 4A and 4B, thereby securing the passages for lubricating oil between the adjacent projections 17.

Figure 5:
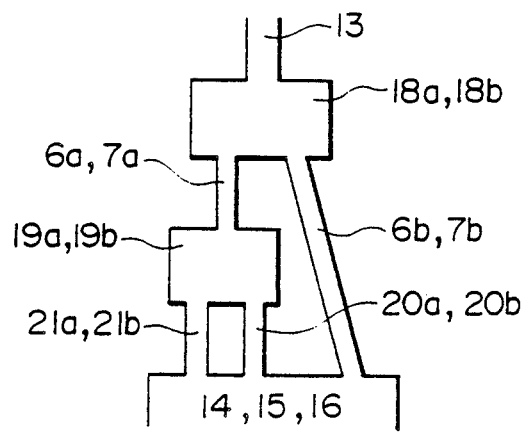
FIG. 5 is a schematic illustration of a lubricating oil supply path in the rolling bearing arrangement of FIG. 3.
Figure 6:
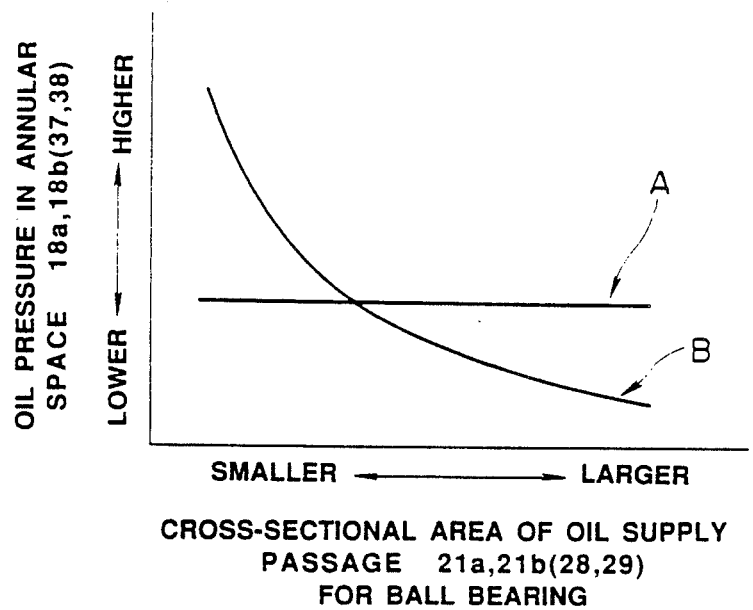
FIG. 6 is a graph showing an advantageous effect of the arrangement of the present invention of FIG. 3 in composition with the conventional arrangement of FIG. 1.

FIG. 5 schematically illustrates the configuration of a lubricating oil supply path of the above discussed rolling bearing arrangement of FIG. 3, in which the same reference numerals designate the same spaces, clearances, passages etc. as in FIG. 3. As seen from FIG. 5 in comparison with FIG. 2 (the schematic illustration of the lubricating oil supply path of the conventional rolling bearing arrangement of FIG. 1), the lubricating oil supply passage configuration of the rolling bearing arrangement of the present invention provides a much smaller oil pressure variation in the first annular spaces 19a, 19b even in the case that the cross-sectional area of the oil supply passage 21a, 21b is adjusted to optimize the supply amount of lubricating oil to the ball bearing 4, 5 after adjustment of the thickness and length of the oil film damper clearances 6a, 6b or 7a, 7b to optimize vibration damping performance for the ball bearings, 4, 5. In other words, since there exist the second annular spaces 19a, 19b and the oil film damper clearances 6a, 7a on the upstream side of the oil supply passages 21a, 21b, the oil pressure in the first annular space 18a, 18b is scarecely affected by the oil pressure variation in the second annular space 19a, 19b depending upon the cross-sectional area variation of the oil supply passage 21a, 21b as shown in FIG. 6 illustrating the experimental data of relationship between the oil pressure in the (first) annular space 18a, 18b (in FIG. 3), 37, 38 (in FIG. 1) and the cross-sectional area of the oil supply passage 21a, 21b (in FIG. 3), 28, 29 (in FIG. 1) for the ball bearing. In FIG. 6, a line A indicates experimental data for the present invention for the arrangement in FIG. 3 while a line B indicates the experimental data of the conventional arrangement of FIG. 1. The graph of FIG. 6 demonstrates that almost no pressure variation arises in the first annular space 18a, 18b even upon variation of the cross-sectional area of the oil supply passages 21a, 21b in the arrangement of the present invention, whereas a large pressure variation arises in the annular space 37, 38 upon variation of the cross-sectional area of the oil supply passages in the case of the conventional arrangement of FIG. 1. As will be apparent from the above, according to the lubricating oil supply path configuration of the present invention, even if the supply amount of the lubricating oil to the ball bearing 4, 5 is adjusted to an optimum value after the vibration damping performance by the oil film damper 6, 7 is adjusted to an optimum value, the vibration damping performance cannot be degraded thereby achieving compatibility of attaining a required vibration damping performance and optimizing the supply amount of lubricating oil to the ball bearing 4, 5.

While adjustment of the lubricating oil supply amount to the ball bearings 4, 5 has been shown and described as being made by adjusting the size of the oil supply passages 21a, 21b, it will be understood that such an adjustment of the lubricating oil supply amount may be made by adjusting the clearances of the bypass passages 20a, 20b formed between the peripheral surface of the land portion L₃ of the outer sleeves 4a, 5a and the inner peripheral surface of the bearing housing 2, in which the clearances of the bypass passages 20a, 20b can be adjusted in cross-sectional area within a range of about 1 to 8 times of the oil film damper clearances 6a, 6b or 7a, 7b thereby increasing freedom in adjustment of lubricating oil supply amount to the ball bearing 4, 5.

In this embodiment, since the second annular space 19a, 19b serving as an oil sump is formed upstream of the oil supply passage 21a, 21b, stable supply of lubricating oil to the boll bearings 4, 5 can be achieved. Furthermore, it is preferable that the inner diameter (the difference between the pitch diameter and the wire diameter) of the coil spring 8 and/or the inner diameter of the outer sleeves 4a, 5a (formed with the oil supply passage 21a, 21b) are generally equal to or larger than the inner diameter of the outer race of the ball bearings 4, 5. With this configuration, lubricating oil can smoothly flow from the ball bearings 4, 5 to the inner peripheral surface of the outer sleeves 4a, 5a and to the coil spring 8 and thus be discharged through the central oil outlet opening 14, so that sections S indicated by phantom circles in FIG. 3 are prevented from serving as the the oil sumps. Accordingly, oil stirring resistance or loss of the ball bearings can be prevented from being increased, thereby obtaining good rotation response of the ball bearing.

While the principle of the present invention has been shown and described as being applied to the ball bearing arrangement in which the turbine shaft of the supercharger (turbocharger) is journalled, it will be understood that the principle may be applied to the rolling bearing arrangement for other high speed rotating machines.

What is claimed is:

1. A rolling bearing arrangement comprising:
a bearing housing;

a pair of rolling bearings, supported to provide support to a shaft therebetween relative to and adjacent opposite ends of said bearing housing;

a pair of outer sleeves with one outer sleeve secured to and surrounding the periphery of each of said rolling bearings, sid rolling bearings being respectively supported through said outer sleeves to said bearing housing;

a pair of first annular spaces, respectively defined between an outer peripheral surface of each of said outer sleeves and an inner peripheral surface of said bearing housing;

an oil inlet opening opened at an inner periphery of said bearing housing, a flow of lubricating oil being supplied through said oil inlet opening to said first annular spaces;

an oil film damper clearance formed between each of said outer sleeves and said bearing housing inner periphery and located adjacent each of said first annular spaces in an axial direction of said outer sleeve, the entire amount of a lubricating oil flow supplied to said first annular spaces passing through said oil film damper clearance;

a second pair of annular spaces, respectively defined between said outer sleeves and said bearing housing inner periphery, at least a part of the lubricating oil flow passed through said oil film damper clearance being supplied to said second annular spaces;

an oil supply passage formed in each of said outer sleeves adjacent to and inboard of the corresponding rolling bearing supported therein, whereby lubricating oil from said second annular spaces is introduced to respective ones of said rolling bearings;

a thrust receiving member restraining pin extending inward of said bearing housing;

a thrust receiving member having an aperture therein to receive said thrust receiving member restraining pin to be made non-rotatable thereby while transmitting a thrust to said bearing housing;

a spring disposed between said pair of outer sleeves to bias them outwardly of said thrust receiving member; and an oil bypass passage between an inboard end of each of said outer sleeves and an adjacent end of said thrust-receiving member, through which lubricating oil from said second pair of annular spaces is introduced to an oil outlet opening through which the lubricating oil is discharged out of said bearing housing.

2. A rolling bearing arrangement as claimed in claim 1, wherein:
each said outer sleeve is coaxially formed at its outer periphery with first and second annular grooves which are separate from each other, said first and second annular grooves defining respectively said first and second annular spaces.

3. A rolling bearing arrangement as claimed in claim 2, wherein:
said oil supply passage is formed through one of said outer sleeves to communicate corresponding second annular groove with an inside portion of the corresponding outer sleeve.

4. A rolling bearing arrangement as claimed in claim 1, wherein:
each said oil film damper clearance includes said first and second oil film damper clearances, said first oil film damper clearance being formed between said first and second annular spaces in the axial direction of said outer sleeve, said second oil film damper clearance being formed on the opposite side of said first oil film damper clearance with respect to said first annular space in the axial direction of said outer sleeve.

5. A rolling bearing arrangement as claimed in claim 1, wherein:
each said outer sleeve is coaxially formed with first and second land portions, said first land portion being located between said first and second grooves in the axial direction of said outer sleeve and defining said first oil film damper clearance, said second land portion being located on opposite side of said first land portion with respect to said first groove in the axial direction of said outer sleeve and defining said second oil film damper clearance.

6. A rolling bearing arrangement as claimed in claim 1, wherein:
each said outer sleeve is coaxially formed at its inner periphery with an annular cutout in which an outer race of said rolling bearing is fixedly fitted.

7. A rolling bearing arrangement as claimed in claim 1, wherein:
each said rolling bearing has an inner race to which a turbine shaft of a turbocharger is fitted.

8. A rolling bearing arrangement as claimed in claim 1, wherein:
said oil bypass passage is defined in part by a plurality of projections provided at said inboard ends of said outer sleeves to contact said thrust receiving member.

9. A rolling bearing arrangement, comprising:
a bearing housing;
a rolling bearing supported relative to said bearing housing;
an outer sleeve secured to and surrounding the periphery of said rolling bearing, said rolling bearing being supported through said outer sleeve to said bearing housing;
a first annular space between said outer sleeve and inner periphery of said bearing housing;
an oil inlet opening opened at the inner periphery of said bearing housing, a flow of lubrication oil being supplied through said oil inlet opening to said first annular space;
an oil film damper clearance formed between said outer sleeve and said bearing housing inner periphery and located adjacent said first annular space in an axial direction of said outer sleeve, the entire amount of a lubricating oil flow supplied to said first annular space passing through said oil film damper clearance;
a second annular space between said outer sleeve and said bearing housing inner periphery, at least a part of the lubricating oil flow passed through said oil film damper clearance being supplied to said second annular space is introduce to said rolling bearing; and
an oil bypass passage through which lubricating oil from said second annular space is introduced to an oil outlet opening through which the lubricating oil is discharged out of said bearing housing;
wherein said outer sleeve is coaxially formed at its outer periphery with first, second and third land portions, said first land portion being located between said first annular spaces in the axial direction of said outer sleeve and defining a first oil film damper clearance, said second land portion being located on an opposite side of said first land portion with respect to said first annular space in the axial direction of said outer sleeve and defining said second oil film damper clearance, said third land portion being located on the opposite side of said first land portion with respect to said second annular space and on the inner side of said second annular space in the axial direction of said outer sleeve, said third land portion defining an oil bypass between an outer periphery of said third land portion and said bearing housing inner periphery, lubricating oil in said second annular space flowing through said oil bypass passage to said oil outlet opening.

* * * * *